United States Patent
Wright et al.

(10) Patent No.: US 6,442,598 B1
(45) Date of Patent: Aug. 27, 2002

(54) SYSTEM AND METHOD FOR DELIVERING WEB CONTENT OVER A BROADCAST MEDIUM

(75) Inventors: Anne Wright; James Randal Sargent; Carl R. Witty, all of Bellevue; Brian K. Moran, Issaquah; David Feinleib, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/958,609

(22) Filed: Oct. 27, 1997

(51) Int. Cl.⁷ .................. G06F 15/16; G06F 15/167; G06F 15/173
(52) U.S. Cl. .................. 709/217; 709/216; 709/239
(58) Field of Search .................. 709/217, 216, 709/218, 219, 226, 224, 239

(56) References Cited

U.S. PATENT DOCUMENTS

| | | | | |
|---|---|---|---|---|
| 5,774,664 A | * | 6/1998 | Hidary et al. | 395/218 |
| 5,828,839 A | * | 10/1998 | Monocreiff | 395/204 |
| 5,832,223 A | * | 11/1998 | Hara et al. | 395/217 |
| 5,861,883 A | * | 1/1999 | Cuomo et al. | 345/326 |
| 5,867,208 A | * | 2/1999 | McLaren | 348/13 |
| 5,889,950 A | * | 3/1999 | Kuzma | 395/218 |
| 5,893,091 A | * | 4/1999 | Hunt et al. | 707/3 |
| 5,903,816 A | * | 5/1999 | Broadwin et al. | 455/3.1 |
| 5,907,322 A | * | 5/1999 | Kelly et al. | 345/327 |
| 5,987,454 A | * | 11/1999 | Hobbs | 707/4 |
| 6,021,433 A | * | 2/2000 | Payne et al. | 709/219 |
| 6,085,226 A | * | 7/2000 | Horvitz | 709/203 |
| 6,088,717 A | * | 7/2000 | Reed et al. | 709/201 |

FOREIGN PATENT DOCUMENTS

| | | | |
|---|---|---|---|
| EP | 0 851 364 A | | 7/1998 |
| WO | WO 97/48198 | | 12/1997 |

OTHER PUBLICATIONS

Harvest User's Manual by Darren R. Hardy et al., Version 1, Oct. 1994, pp. 1–42.*

"Internet Services Via Direct Broadcast Satellites", Horst D. Clausen and Bernhard Nocker, Feb. 5, 1997, pp. 468–475.

"How Push Servers Work", Todd Spangler, PC Magazine, Jun 10, 1997, pp. 1–3, http://www8.zdnet.com/products/content/pcmg/1611/pcmg0114.html.

"Bringing Push Technology to the Masses", Astound Web-Cast in the News, Jun., 1997, pp. 1–4, http://www.astound-.com/products/webcast/wcinnews.html.

* cited by examiner

*Primary Examiner*—Zarni Maung
(74) *Attorney, Agent, or Firm*—Lee & Hayes, PLLC

(57) ABSTRACT

A webcast system delivers Web content from a webcast center over a broadcast medium to many clients. The webcast center has a server unit that gathers Web pages from sites on the Internet and stores the pages in a cache. The server unit bundles the pages from the cache into package files and stores the package files in a package store. The webcast center also has a broadcast unit that retrieves the package files from the package store and delivers the package files to the clients over the broadcast medium. Each client is equipped with a receiver to receive the broadcast package files. The client maintains a subscription database to store a directory of the Web content gathered by the webcast center. A subscriber user interface enables a user to select preferred Web content from the directory of the subscription database. The client creates a filter based on the user's preferences which is used to direct the receiver to collect only the package files carrying the preferred Web content, while rejecting packages carrying unwanted Web content.

34 Claims, 5 Drawing Sheets

SYSTEM AND METHOD FOR DELIVERING WEB CONTENT OVER A BROADCAST MEDIUM

TECHNICAL FIELD

This invention relates to systems and methods for delivering Web related information over a broadcast medium. This invention further relates to computer devices and software used to implement aspects of the systems and methods.

BACKGROUND OF THE INVENTION

Public networks, and most notably the Internet, are emerging as a primary conduit for communications, entertainment, and business services. The Internet is a network formed by the cooperative interconnection of computing networks, including local and wide area networks. It interconnects computers from around the world with existing and even incompatible technologies by employing common protocols that smoothly integrate the individual and diverse components.

The Internet has recently been popularized by the overwhelming and rapid success of the World Wide Web (WWW or Web). The Web links together various topics in a complex, non-sequential web of associations which permit a user to browse from one topic to another, regardless of the presented order of topics. The Web is rapidly evolving as a standard for distributing, finding, and accessing information of any type. A "Web browser" is an application that executes on the user's computer to navigate the Web. The Web browser allows a user to retrieve and render hypermedia content from the WWW, including text, sound, images, video, and other data.

The amazing growth rate in the demand for data over the Internet is partly due to an increasing audience. The World Wide Web has crossed the threshold that makes it affordable and interesting to a much larger audience. There is information available on a very wide variety of topics, and tools exist to help people find and view the information cost effectively. Another factor fueling the Internet growth is the increasing data demands per individual user. There is a trend for web sites to evolve from using pure text to richer media, such as pictures, sound, and video. Adding these richer media is popular because they present information more clearly, thereby enhancing a site's impact and popularity.

Unfortunately, a problem facing the continued growth and acceptance of the Internet is that conventional methods for accessing the Web do not scale well to meet the rapid growth in demand. The quality of service for the Web is intuitively measured by the user as the amount of time between requesting a Web page and being able to view it. Internet users have been conditioned through their experiences with television and standalone multimedia applications to expect instantaneous results on demand. Users are accustomed to changing the channel and instantaneously viewing the video content for that channel on the screen. The Internet is unable, however, to deliver data instantaneously. For the most part, the Internet has significant latency problems that reduce fairly routine Web browsing exercises to protracted lessons in patience.

The basic dilemma is that the quality of service degrades as more people try to use the Web. More unsettling is the corollary that service for popular Web sites is typically much worse than service for unpopular sites. At the root of the service problem is the inability to serve Web data rapidly as a result of too little bandwidth in the distribution network.

"Bandwidth" is the amount of data that can be moved through a particular network segment at any one time. The Internet is a conglomerate of different technologies with different associated bandwidths. Distribution over the Internet is usually constrained by the segment with the lowest available bandwidth.

Consider the Internet system 20 shown in FIG. 1. The Internet system 20 includes a Web server 22 that stores and serves data over the Internet 24 to regional point of presence (POP) operators or independent service providers (ISPs), as represented by ISP 26. The ISP 26 provides connectivity to the Internet 24 to many users, as represented by subscriber computers 28, 30, and 32.

The ISP 26 is connected to the Internet 24 via a network connection 34. In this example illustration, the network connection 34 is a "T1" connection. "T1" is a unit of bandwidth having a base throughput speed of approximately 1.5 Mbps (Megabits per second). Another common high bandwidth connection is a T3 connection, which has a base throughput speed of approximately 44.7 Mbps. For purposes of explaining the state of the technology and the practical problems of delivering content over the Internet, it is sufficient to understand that there is also a limited bandwidth connection between the Web server 22 and the Internet 24.

The subscriber computers 28, 30, and 32 are connected to their host ISP 26 via home entry lines, such as telephone or cable lines, and compatible modems. As examples of commercially available technology, subscriber computer 28 is connected to ISP 26 over a 14.4K connection 36, which consists of a standard telephone line and a V.32bis modem, to enable a maximum data rate of 14.4 Kbps (Kilobits per second). Subscriber computer 30 is connected to the ISP 26 with a 28.8K connection 38 (telephone line and V.34 modem) which supports a data rate of 28.8 Kbps. Subscriber computer 32 is connected to the ISP 26 with an ISDN connection 40, which is a special type of telephone line that facilitates data flow in the range of 128–132 Kbps. Table 1 summarizes connection technologies that are available today.

TABLE 1

Connection Technologies and Throughput

| Connection Type | Base Speed (Kbps) |
| --- | --- |
| V.32bis modem | 14.4 |
| V.34 modem | 28.8 |
| 56K Leased Line | 56 |
| ISDN BRI (1 channel) | 56–64 |
| ISDN BRI (2 channels) | 128–132 |
| Frame Relay | 56–1,544 |
| Fractional T1 | 256–1,280 |
| ISDN PRI | 1,544 |
| Full T1 (24 channels) | 1,544 |
| ADSL | 2,000–6,000 |
| Cable Modem | 27,000 |
| T3 | 44,736 |

With a T1 connection to the primary distribution network 24, the ISP 26 can facilitate a maximum data flow of approximately 1.5 Mbps. This bandwidth is available to serve all of the subscribers of the ISP. When subscriber computer 28 is connected and downloading data files, it requires a 14.4 Kbps slice of the 1.5 Mbps bandwidth. Subscriber computers 30 and 32 consume 28.8 Kbps and 128 Kbps slices, respectively, of the available bandwidth.

The ISP 26 can accommodate simultaneous requests from a number of subscribers. As more subscribers utilize the ISP services, however, there is less available bandwidth to satisfy the subscriber requests. If too many requests are received, the ISP 26 becomes overburdened and may not be able to adequately service the requests in a timely manner, causing frustration to the subscribers. If latency problems persist, the ISP can purchase more bandwidth by adding additional capacity (e.g., upgrading to a T3 connection or adding more T1 connections). Unfortunately, adding more bandwidth may not be economically wise for the ISP. The load placed on the ISP typically fluctuates throughout different times of the day. Adding expensive bandwidth to more readily service short duration high-demand times may not be profitable if the present capacity adequately services the subscriber traffic during most of the day.

The latency problems are perhaps most pronounced when working with video. There are few things more frustrating to a user than trying to download video over the Internet. The problem is that video requires large bandwidth in comparison to text files, graphics, and pictures. Additionally, unlike still images or text files, video is presented as moving images that are played continuously without interruption. Video typically requires a 1.2 Mbps for real-time streaming data. This 1.2 Mbps throughput requirement consumes nearly all of a T1 bandwidth (1.5 Mbps). Accordingly, when multiple subscribers are coupled to the ISP and one subscriber requests a video file, there is generally not enough capacity to stream the video in real-time from the Web server 22 over the Internet 24 to the requesting subscriber. Instead, the video file is typically delivered in its entirety and only then played on the subscriber computer. Unfortunately, even downloading video files in the block data format is often inconvenient and usually requires an excessive amount of time.

Consider the following example. Suppose a subscriber wishes to access a Web site having a 20-second video clip. At 1.2 Mbps, the 20-second video clip involves downloading a 24 Mbyte file over the Internet. If the user has a modest 14.4 Kbps connection, it would take approximately twenty-eight minutes to download the entire file.

Now, assume that the subscriber/ISP connection is sufficiently large to handle real-time video streaming of the video file, meaning that the subscriber computer can render the video data as it is received from the ISP. Despite the bandwidth of the subscriber/ISP connection, real-time video streaming may still be unachievable if the T1 connection 34 between the ISP 26 and the distribution network 24 is unable, or unwilling due to policy reasons, to dedicate 1.2 Mbps of its bandwidth to the video file. Requests for the 20-second video clip made during peak traffic times at the ISP most certainly could not be accommodated by the ISP/network connection. Since adding more bandwidth may be a poor investment for the ISP, the ISP may have no economic incentive to remedy the latency problem. The result is that some users might be inconvenienced by the lack of ability to receive streaming video despite their own connection to the ISP being capable of accommodating streaming video.

The latency problem is further aggravated if the connection between the content server 22 and the distribution network 24 is equally taxed. The lack of sufficient bandwidth at the content server/network link could also prevent real-time video streaming over the Internet, regardless of the bandwidths of the network/ISP link or the ISP/subscriber link. If all links lack sufficient bandwidth, the latency problem can be compounded.

Accordingly, traditional techniques of adding more bandwidth at each connection do not offer an acceptable architecture that scales to meet rising demand. There remains a need to develop improved techniques for facilitating distribution of Web content over the Internet.

SUMMARY OF THE INVENTION

This invention concerns a system for delivering Web content over a broadcast medium from a webcast center to many clients. The webcast center has a server that gathers Web content from sites on the Internet and a broadcast unit that delivers the Web content to the clients over the broadcast medium.

The server includes a gatherer to continuously gather Web content, typically in the form of Web pages, from selected sites. A scheduler tells the gatherer which sites, and what times, to gather the Web content. Preferably, the scheduler sets gathering times during off-peak hours at the sites. The scheduler maintains a schedule database of desired Web sites and content based upon preferences entered by an administrator at the webcast center. The gatherer fetches the content and stores it in a content cache to maintain a current copy of the Web content at the webcast center.

The gatherer is configurable to gather from each site a home Web page at a root URL (Universal Resource Locator) and any additional Web pages within a predefined depth below the root URL. The administrator sets the desired depth for each site. The gatherer also collects any in-line image files referenced by the gathered Web pages.

The webcast server has a packager to retrieve the Web content from the content cache and package the Web content into package files. The packager stores the package files in a package store which is separate from the content cache. The packages include data from the Web content and other information provided by the server, such as the size and modification time.

The broadcast unit takes the packages files from the package store, segments them into individual packages, and transmits the packages over the broadcast medium. Preferably, the broadcast unit employs a broadcast transmitter configured as a fault tolerant broadcast file transfer system. The broadcast medium may be any medium that supports multicast package transports. Possible transports include local area Ethernet networks (LANs), and encoding onto digital satellite or broadcast television signals.

Each client is equipped with a receiver to receive the broadcast packages. The client maintains a subscription database to store a directory of the Web content gathered by the webcast center. A subscriber user interface enables a user to select preferred Web content from the directory of the subscription database. The client creates a filter based on the user's preferences. The filter directs the receiver to collect only the preferred Web content, while ignoring packages carrying unwanted Web content.

As the preferred Web content is received, the client reconstructs the package files and temporarily stores them in a package store. An unpackager reconstructs the Web content from the package files in the package store. The unpackager is configured to determine whether the Web content received in the broadcast packages is more recent than the same Web content that the user might have collected on his/her own from the same site. If the broadcast content is a more recent copy, the client retains that version; otherwise, the client discards the broadcast package files in favor of the more recent version.

The client annotates any hyperlinks contained in the Web pages. The annotations differentiate among links that have been actuated, links that go to content stored locally at the client as a result of the broadcast transmission, and links that go to content stored remotely from the client. The annotation may be in the form of color variations, or stylistic changes.

DETAILED DESCRIPTION

Figure 1:
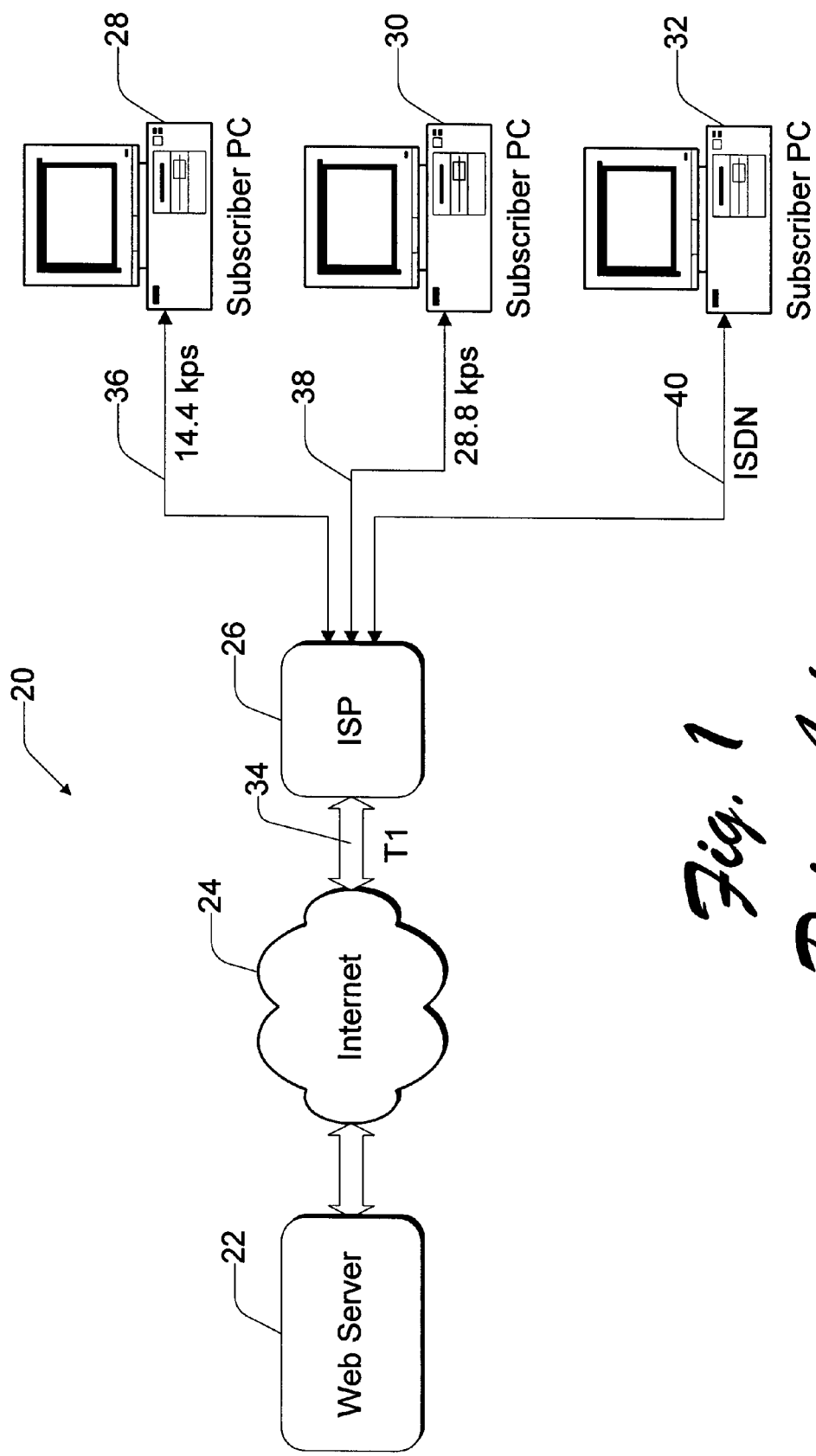
FIG. 1 is a diagrammatic illustration of a prior art Internet system.
Figure 2:
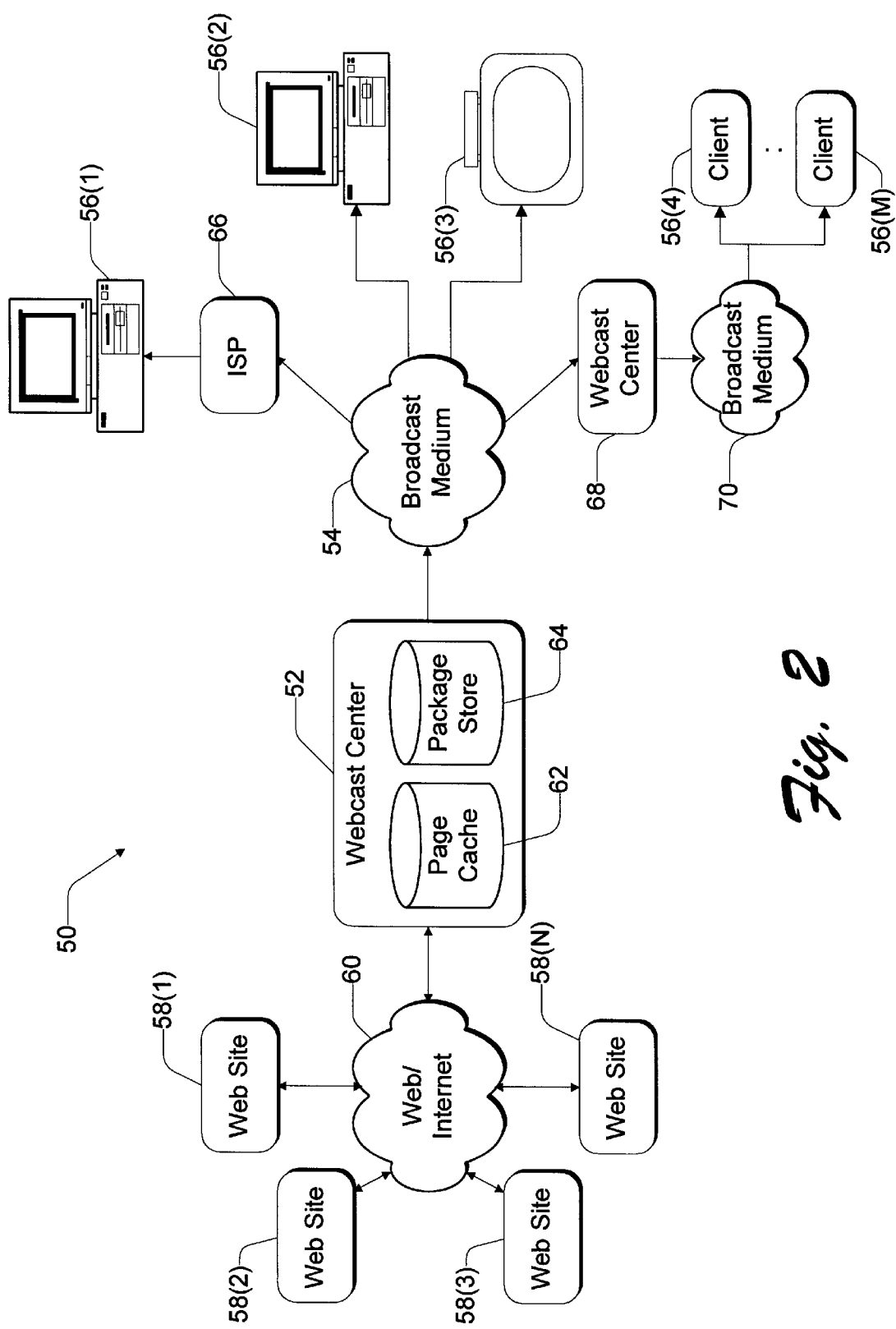
FIG. 2 is a diagrammatic illustration of a webcasting system for delivering Web content from a webcast center over a broadcast medium to multiple clients.

FIG. 2 shows a webcast system 50 for delivering Web content from a webcast center 52 over a broadcast medium 54 to multiple clients 56(1)–56(M). The webcast center 52 gathers Web content from the World Wide Web by visiting web sites 58(1)–58(N) via the Internet 60 and fetching content from those sites. The Web content is typically in the form of Web pages found at the sites. A Web page is a title, collection of information, and pointers or "hyperlinks" to other information. A Web page may be constructed from various types of content including computer data, audio, video, animation, bit maps or other graphics, applications or other executable code, text, hypermedia, or other multimedia types.

The webcast center 52 collects Web pages from the Internet's World Wide Web 60 and stores them in a page cache 62. A system administrator sets a schedule that establishes which sites are visited by the webcast center 52, the time and frequency of the visits, and the type of content collected.

Apart from the gathering process, the webcast center 52 retrieves the pages from the page cache 62, bundles them into composite package files, and stores them in a package store 64. The package store 64 is preferably a separate database than the page cache 62. The webcast center 52 fetches the package files from the package store 64, segments the package files into individual packages (or packets), and transmits the packages over the broadcast medium 54.

The broadcast medium 54 is a unidirectional network in which packages are delivered from the webcast center 52 to the clients 56(1)–56(M) without requiring return communication from the clients. The broadcast medium 54 can be characterized as a shared, highly asymmetrical, network resource with a limited, if not completely absent, low speed return path that does not need to be active to receive broadcast transmissions. The broadcast medium 54 may comprise the entire distribution network between the webcast center and clients, or it may be a single link in a larger distribution network.

The broadcast medium 54 may be implemented in a variety of ways. The broadcast medium 54 might be implemented, for example, as a wireless network configured for one-way transmission (i.e., satellite, radio, microwave, etc.). The broadcast medium 54 might also be configured as a network that supports two-way communication (i.e., Internet, LAN (local area network), and WAN (wide area network)), but can be used for unidirectional multicasting from the webcast center to the clients.

The clients 56(1)–56(M) represent various types of constructions. The clients can be implemented as essentially any type of computing device that can receive and reconstruct data packages, and render the packages on a display. As one possible implementation, the client may be constructed as a desktop computer, as represented clients 56(1) and 56(2), that are specially configured with software/hardware components described below with respect to FIG. 4. Client 56(1) receives broadcast Web content from the broadcast medium 54 via an Independent Service Provider (ISP) 66, rather than receiving the broadcasts directly. On the other hand, client 56(2) is a broadcast-enabled personal computer that is capable of receiving the broadcast packets directly.

One example implementation of a broadcast-enabled PC is described in a co-pending U.S. patent application Ser. No. 08/653,663, filed Jan. 29, 1996, which is a continuation of U.S. patent application Ser. No. 08/503,055, entitled "Broadcast-Enabled Personal Computer," filed Jan. 29, 1996, which is now abandoned. These applications were filed in the names of Gabe L. Newell, Dan Newell, Steven J. Fluegel, David S. Byrne, Whitney McCleary, James O. Robarts, Brian K. Moran; William B. McCormick, T. K. Backman, Kenneth J. Birdwell, Joseph S. Robinson, Alonzo Gariepy, Marc W. Whitman, and Larry Brader. This application is assigned to Microsoft Corporation, and is incorporated herein by reference.

Another implementation of a client is a Web-enabled television, as represented by client 56(3), which has a set-top box or internal computing unit that permits receipt and rendering of Web content. In addition to desktop computers and Web-enabled TVs, other possible clients include workstations, laptop computers, palmtop computers, network computers, and the like.

According to an aspect of this invention, another distribution entity may act as a "client" to the webcast center 52. As shown in FIG. 2, the regional Independent Service Provider (ISP) 66 might be a subscriber to the broadcast transmissions received over the broadcast medium 54 from the webcast center 52. The ISP 66 stores the webcast content and distributes it to its own clientele, such as client 56(1), using conventional distribution techniques.

As another example of an intermediary distribution entity, a secondary webcast center 68 may function as a "client" to the primary webcast center 52. In addition to its own independent gathering process, the secondary webcast center 68 also receives and re-broadcasts the Web content received from the primary webcast center 52 to a set of clients 56(4)–56(M) over a broadcast medium 70. One implementation of this dual webcast center architecture is that the primary webcast center 52 is a primary head end that distributes nationally or globally via satellites, and the secondary webcast center 54 is a regional distributor that distributes the Web content via RF (radio frequency) or microwave transmission.

The webcast system 50 advantageously distributes Web content to many clients (potentially millions) without burdening the limited bandwidth of the Internet. Broadcasting the Web pages over a one-to-many broadcast medium avoids the bottlenecks caused by overburdened ISP connections or slow client modem connections. Since the ISP might be a client of the broadcast medium, the broadcast alternative offers additional bandwidth at a fraction of the cost that would be incurred if the ISP installed additional Internet connections, such as T1 or T3 connections.

The webcast system 50 also addresses the server scalability problem. Many clients can be added to the system to receive broadcast data at no incremental cost to the webcast center 52. The load on the webcast center 52 is constant because only it accesses the sites on the Internet, regardless of the number of clients receiving the broadcast transmissions.

Webcast Center

Figure 3:
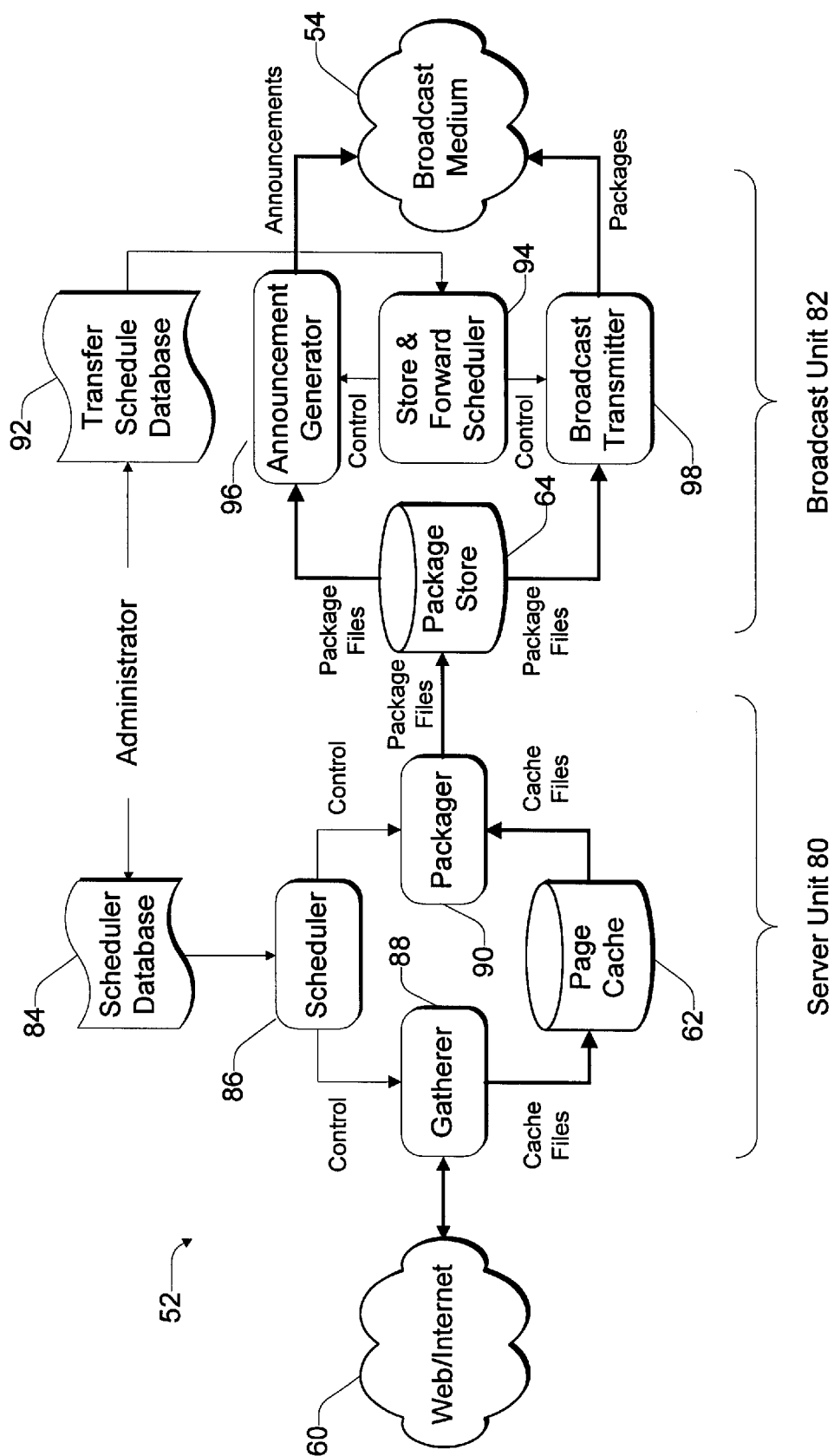
FIG. 3 is a functional block diagram of the webcast center.

FIG. 3 shows the architecture of the webcast center 52 in more detail. It generally comprises a server unit 80 and a broadcast unit 82. The server unit 80 is responsible for gathering Web pages from the Web 60 and converting the pages to package files suitable for broadcast transmission. The broadcast unit 82 is responsible for transmitting the package files over the broadcast medium 54.

A human administrator sets up a schedule database 84 that contains a listing or directory of Web content that the administrator desires to gather. The directory specifies a set of webcast groups, which may represent content from a single site, or content from multiple sites. The directory includes a name for each webcast group, the Web pages to be included in each group, and time periods at which the server unit 80 should fetch new updates for that group.

A scheduler 86 reads from the schedule database 84 and establishes a schedule of sites and times for fetching content for specific Webcast groups. When the scheduler 86 determines that it is time to retrieve Web pages from a is particular site, the scheduler 86 invokes a gatherer 88 to gather the Web pages from sites on the Internet 60. The gatherer 88 fetches a specified group according to the specifications dictated by the scheduler 86, as entered by the administrator into the scheduler database 84.

For each group, the gatherer 88 visits one or more sites holding the Web content for the group. The gatherer 88 accesses a Web page at the root URL (Universal Resource Locator) for each of the sites. The Web page at the root URL is commonly referred to as the "home" Web page. A URL describes everything about a particular resource that is needed to request the resource from a particular site. The URL describes the protocol the gatherer 88 uses to retrieve the resource, the name of the computer the resource is on, and the path and file name of the resource. The following is an example of a root URL:

http://www.microsoft.com

The "http://" portion of the URL describes the protocol. The letters "http" stand for HyperText Transfer Protocol, the set of rules that the gatherer follows to request a document and the remote server will follow to supply the document. The "www.microsoft.com" portion of the URL is the name of the remote host computer that maintains the document. In this example, a home Web page for Microsoft Corporation is presented at the root URL.

Web pages are typically written in a "markup language," such as SGML (Standard Generalized Markup Language). SGML is defined formally as a language for document representation that formalizes markup and frees it of system and processing dependencies. SGML is a language for describing the structure of documents and for describing a tagging scheme to delineate that structure within text. More specifically, Web pages utilize a subset of SGML called "HTML" (Hypertext Markup Language). An HTML document can be thought of as plain text that contains formatting instructions in the form of HTML markup codes or "tags." The tags explain how to render and print documents, and are also used to specify hyperlinks.

Home pages contain general data about the site and commonly provide hyperlinks (or simply "links") to additional pages. Hyperlinks are symbols or instructions describing where to find other related Web pages on the host computer, or on the Internet. A hyperlink from one hypermedia topic to another is normally established by the author of the page and is typically rendered as a graphical icon or as highlighted keywords. The following is a simple example of a portion of an HTML Web page containing a single hyperlink:

Microsoft has a Web page with the latest <A HREF= "HTTP://www.microsoft.com/upgrades"> upgrades</A> to its popular word processing program.

When rendered by a browser, the word "upgrades" appears highlighted and/or underlined, and the text within the angled brackets does not appear at all, as follows:

Microsoft has a Web page with the latest upgrades to its popular word processing program.

By clicking on the highlighted keyword "upgrades," the user can instruct the Web browser to activate the underlying URL. In this case, the underlying URL is a subroot of the root URL, as follows:

http://www.microsoft.com/upgrades

The portion "/upgrades" attached to the root URL defines a path and file name of the page on the remote host computer, or other server specified by the host computer, one depth level beneath the home page at the root URL.

The administrator of the webcast center 52 establishes the depth at which the gatherer 88 is to collect pages. For a given group, the administrator sets a depth limit specifying the number of levels beneath the home page that are to be collected by the gatherer 88. For example, the administrator might prescribe a depth limit of three levels. The gatherer 88 collects the home page (at depth 0) and all subroots between the home page and any URL having the following structure:

http://root URL/level 1/level 2/level 3

The gatherer 88 travels down the hyperlink paths to retrieve each page or content specified by the hyperlink. For each page, the gatherer 88 is preferably configured to grab any in-line image files referenced by the Web page.

As the pages are gathered, the gatherer 88 stores the pages in the page cache 62. One preferred optimization technique is to check the modification dates of the pages prior to retrieving and store them. The gatherer 88 checks these dates against the modification dates of the same pages that might already be held in the page cache 62. Pages that have not changed since the last time they were gathered (i.e., those pages having the same modification dates as stored pages) are not copied. Pages that have been updated since they were last gathered, however, are retrieved and stored in the page cache 62. In this manner, the gatherer 88 effectively updates the webcast groups maintained in the page cache 62 in an efficient gathering process.

The gatherer 88 informs the scheduler 86 when its finishes gathering all of the specified content in a group. The gatherer 88 may then proceed to a next group according to the schedule laid out by the scheduler 86. If the schedule dictates, the gatherer 88 may continuously gather pages for webcast groups to routinely refresh the pages in the page cache 62.

After the gatherer 88 has updated a group, the scheduler 86 invokes a packager 90 to package the webcast group. The packager 90 queries the page cache 62 to determine what pages are in the group, how large the pages are, and how they should be partitioned into package files. In one implementation, the individual pages in a group are partitioned into package files according to the following rules:

1. Organize pages in alphabetical order according to their URLs.

2. Create a new package file for the first URL.
3. Add one or more pages to the package file. If adding another page to the current package file causes the package file to exceed a maximum size (as set in the server unit configuration) or causes the package file to contain pages from more than one site, close the package file and create a next new package file.

For each set of URLs to be put in the same package file, the packager 90 retrieves the pages and information from the page cache 62, appends header information about the group, and stores the package file in the package store 64. When the packager 90 completes all package files for the group, it informs the scheduler 86 that the group is updated.

At this point, the package files are essentially broadcast ready and only need to be packetized into discrete packets for broadcast transmission. The package files represent a more up-to-date version of the Web content for the webcast group. The broadcast unit 82 may now broadcast the webcast group to provide the up-to-date version to the clients.

It is noted that the scheduler 86, gatherer 88, and packager 90 are preferably implemented in software that executes on one or more computers at the webcast center 52. These programs are stored in memory, such as the disk memory of the computers, and execute on processing units. As one possible example, the computers at the webcast center might be implemented as servers that run a server operating system such as Windows® NT from Microsoft Corporation, or a UNIX-based operating system. The scheduler 86, gatherer 88, and packager 90 are software modules that run atop the operating system on the server.

With continuing reference to FIG. 3, the broadcast unit 82 takes the package files in the package store 64, converts them to transmittable packets, and broadcasts the packets over the broadcast medium 54. The broadcast unit 82 is is preferably implemented at a broadcast head end (e.g., satellite uplink, cable head end, TV broadcast station, etc.), which may or may not comprise the same group of server computers of the server unit 80. It may be desirable to physically separate the broadcast unit 82 from the server unit 80. The server unit 80 involves human administration in editing the scheduler database 84 in response to changes in the webcast groups, the schedule, client preferences, and the web sites. It may not be feasible to locate people at the webcast head end.

With respect to the broadcast unit 82, an administrator sets up a transfer schedule database 92 that contains a listing of when or at what frequency various webcast groups are to be transmitted over the broadcast medium 54 to the clients. The administrator can edit the database 92 remotely, or transfer the information over the network from the server unit 80 to the database 92, if the broadcast unit 82 is physically remote from the server unit 80. A store and forward scheduler 94 reads the database 92 to determine when sets of package files pertaining to scheduled webcast groups are to be transmitted over the broadcast medium 54.

Transmission of a package file is a two-stage process. The first stage is to announce a time that the package or set of packages pertaining to a webcast group will be transmitted. The second stage is to send the packages themselves at the announced time.

During the announcement stage, the store and forward scheduler 94 invokes an announcement generator 96 to create announcements of upcoming broadcast transmissions. The announcements contain many of the details pertaining to delivery and receipt of the broadcast files and include sufficient information for the client to decide whether to receive the packages. The announcements might contain, for example, the name of the webcast group to be transmitted, an address (or frequency) and time of the transmission, the size of the packages, the range of URLs for the group, whether to place the packages in the client's browser cache or file system, and so forth. The announcements are typically orders of magnitude smaller than the package files themselves.

The announcements are sent on a well-known address to which all clients listen. The announcements are preferably sent using Session Announcement Protocol (SAP), a protocol typically used to announce multicast data over networks. The SAP protocol itself is well known, and is described in M. Handley "SAP: Session Announcement Protocol", INTERNET-DRAFT, draft-ietf-mmusic-sap-00.txt, Nov. 27, 1996.

Various announcement techniques may be used with this invention. One example of a suitable announcement technique is described in a co-pending U.S. patent application entitled, "Transmission Announcement System And Method For Announcing Upcoming Data Transmissions Over A Broadcast Network," filed in the names of Kenneth J. Birdwell, Brian Moran, Randy Sargent, Carl Witty, and David S. Byrne. This application is assigned to Microsoft Corporation and is incorporated by reference.

After a sufficient delay to allow the clients time to receive the announcements and decide whether to receive the Web content packages, the store and forward scheduler 94 invokes a broadcast transmitter 98 to transmit the packages. The broadcast transmitter 98 retrieves the package files from the package store 64 and segments the package files into transmittable packets or packages. The size and configuration of the packages differ depending upon the broadcast medium and transport being used. For example, a broadcast transmitter embodied for satellite transmission will create digital packets of one size and configuration, whereas a broadcast transmitter embodied for LAN transmission will create Ethernet packets of a different size and configuration. As another example, the broadcast transmitter might configure the packages to be carried as part of a VBI (vertical blanking interval) signal in conventional television broadcasts or as part of a cable TV transmission. The broadcast transmitter 98 transmits the packages to the address (or frequency) and (as near as possible) at the time listed in the announcement.

The broadcast transmitter 98 preferably implements a robust one-way file transfer protocol that can recover from a certain amount of data loss through the broadcast medium. One example of an effective protocol is a broadcast file transfer protocol (BFTP), which is explained in greater detail in a co-pending U.S. patent application Ser. No. 08/871,657, entitled "Data Delivery System And Method For Delivering Data And Redundant Information Over A Unidirectional Network," filed Jun. 9, 1997 in the names of Carl Witty, Kenneth Birdwell, and Randy Sargent, now U.S. Pat. No. 6,081,907. This application is assigned to Microsoft Corporation and incorporated herein by reference.

It is noted that the scheduler 94 and aspects of the announcement generator 96 and broadcast transmitter 98 are preferably implemented in software that executes on one or more computers at the broadcast unit 82. These programs are stored in memory, such as the disk memory of the computers, and execute on processing units.

The webcast center architecture offers many benefits. One benefit is that the Web gathering tasks performed by the server unit 80 are decoupled from the broadcast tasks of the broadcast unit 82. This allows the units to be physically separated and operated independently of one another.

Another advantage is that it promotes flexibility by allowing a more reliable and/or higher bandwidth link between the package store 64 and the broadcast transmitter 98 in comparison to the link between the Web 60 and the package store 64. This allows data to continue flowing to clients even if the connection between the Web 60 and the server unit 80 goes down.

Another benefit is that the architecture takes advantage of fill broadcast bandwidth, even if the connection between the server unit 80 and the broadcast unit 82 transfers less data than can be broadcast. The broadcast center 82 continuously cycles through the package files in the package store 64 and broadcasts them multiple times between updates from the server unit 80. Cycling improves reliability in case of major losses in the broadcast stream and in case of the client not being available to receive the transmissions.

Still another benefit of the architecture is the dual cache arrangement. Pages pulled from the Web are initially stored in the page cache 92. The pages are then subsequently bundled and stored as package files in the package store 64. This dual cache arrangement permits the gatherer 88 to gather pages at one data rate (e.g., modem or T1 connection speeds), and the packager 90 to update the files in the package store 64 at a different data rate. Moreover, the broadcast transmitter 98 can then retrieve and broadcast the package files at a third data rate that is different, and typically much larger, than the first data rate at which the gatherer collects Web pages. Thus, the gathering tasks and performance are independent of the broadcasting tasks and performance.

Client

Figure 4:
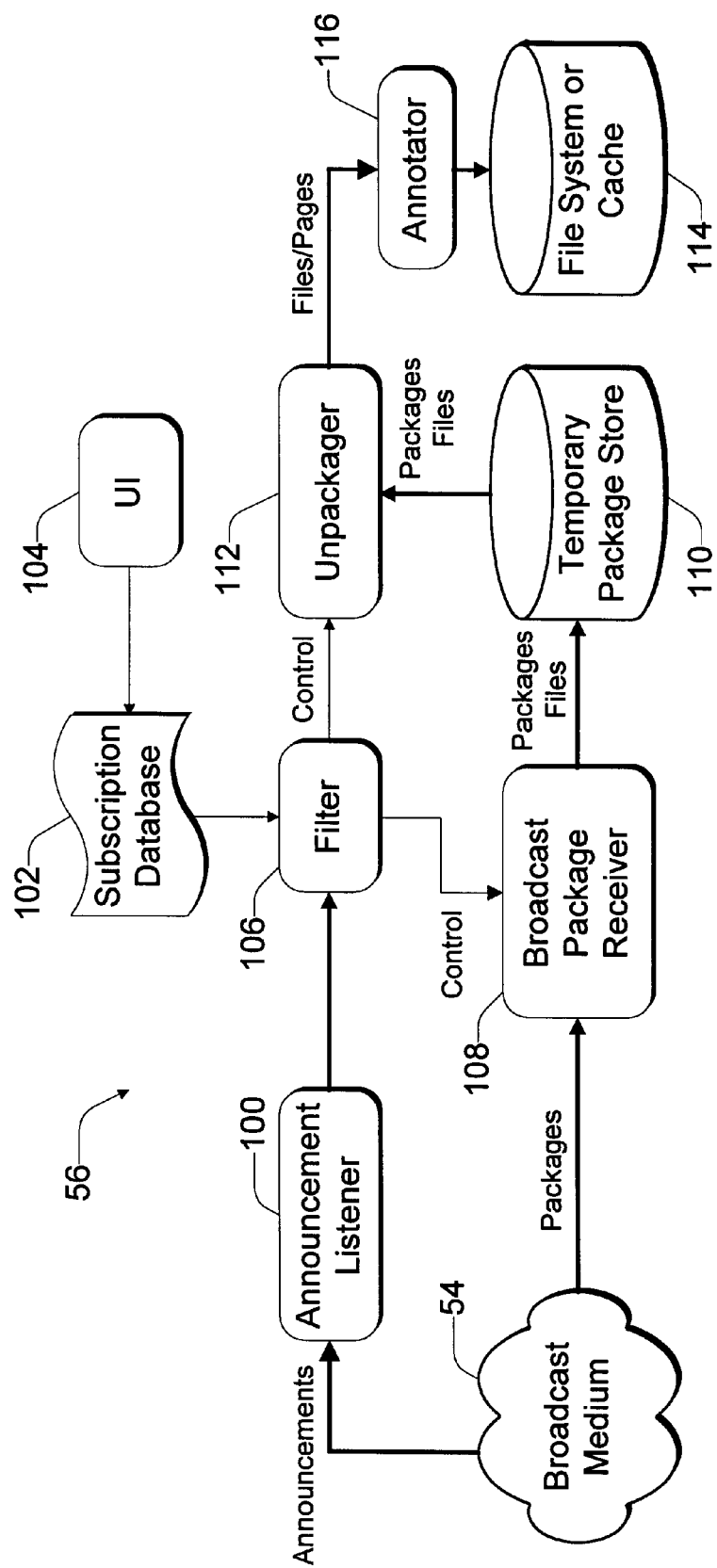
FIG. 4 is a functional block diagram of a client.

FIG. 4 shows the architecture of a client 56 that participates in the webcast system. The client 56 is equipped with appropriate hardware to receive the broadcast transmission packages containing the Web content. For broadcast-enabled PCs, or Web-enabled televisions, this hardware might comprise a satellite dish that receives the satellite broadcasts directly, or a cable box or antenna that receives the digital packages as part of a cable transmission or VBI signal. For clients connected to an ISP, the hardware might comprise a modem to receive the packages over a telephone line from the ISP, who in turn received the packages from the broadcast medium. For clients connected to a LAN, the hardware might comprise a network card or the like to enable reception of the broadcast packets over the network.

The client 56 has an announcement listener 100 tuned to the announcement address to receive the announcements from the webcast center. The announcements received at the listener announce future webcast groups that are to be delivered over the broadcast medium 54.

The client 56 enables the user to select which webcast groups to receive. The webcast center occasionally downloads the directory of Web content maintained in the scheduler database 84. The directory is stored in a subscription database 102 at the client 56. The subscription database 102 thus holds the Web content offered by the webcast center, including the names of the webcast groups, the URL range for the pages within the groups, and so forth.

Figure 5:
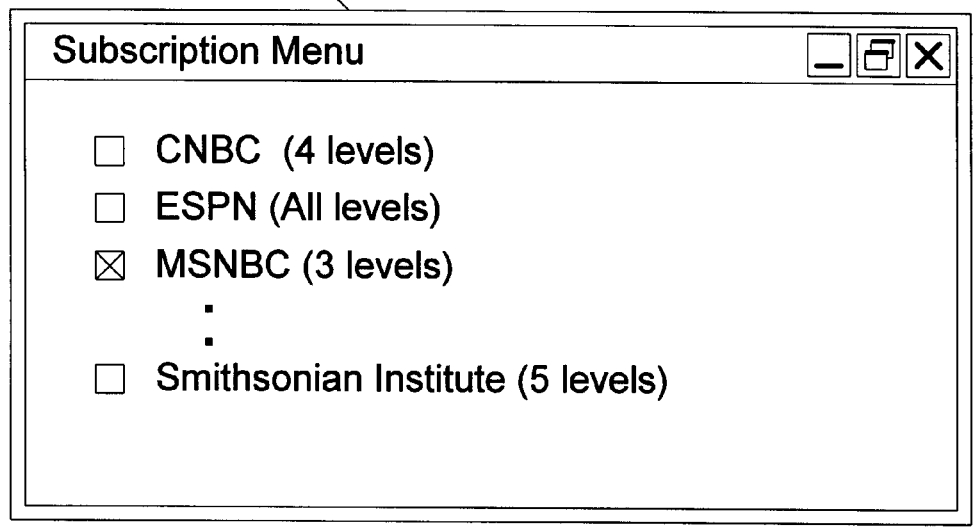
FIG. 5 is a diagrammatic illustration of a subscription user interface implemented at the client to enable a user to select preferred Web content to be delivered over the broadcast medium.

The client supports a subscription graphical user interface (UI) 104, which executes on the client processor, to permit the user to view the directory in the scheduler database 102. FIG. 5 shows subscription UI 104 according to one possible graphical layout. The UI 104 presents the list of available content, and enables the user to select one or more of the webcast groups. In this example, the UI 104 shows possible webcast groups of CNBC, ESPN, MSNBC, and the Smithsonian Institute. The directory on UI 104 also indicates the URL depth level, as listed in the parenthetical trailing the group name. The user can select one or more groups by checking the box in front of the name, as shown by the checked MSNBC box. The subscription UI 104 may also display other types of information, such as the cost of a subscription, the subscription term, and frequency of distribution, and so forth.

Figure 6:
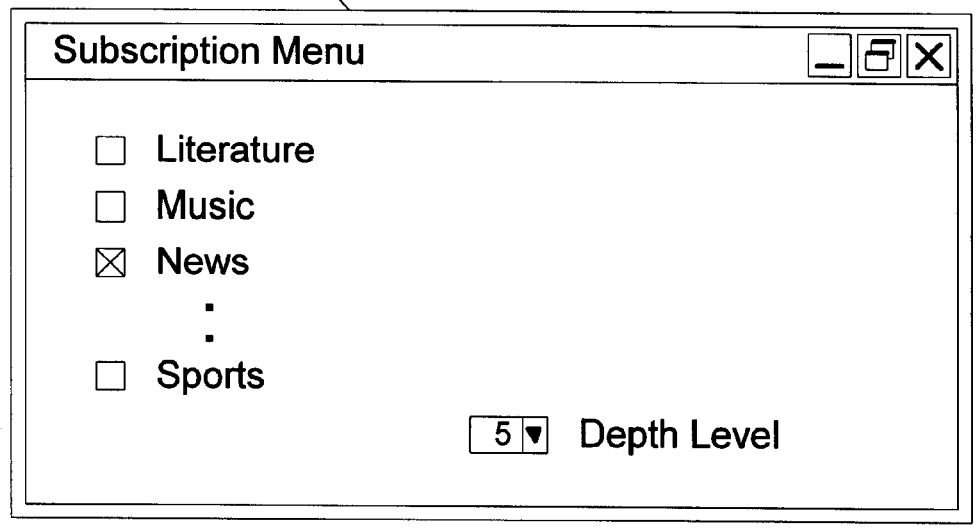
FIG. 6 is a diagrammatic illustration of the subscription user interface according to a second implementation.

FIG. 6 shows a subscription UI 104' according to another possible screen layout. In FIG. 6, the UI 104' presents a set of categories for the user to select according to their preferences. In this example, the UI 104' shows categories of literature, music, news, and sports. The user selects various categories, which are then translated to one or more webcast group in the subscription database 102 that comply with the category selections.

The subscription user interfaces shown in FIGS. 5 and 6 are provided for example purposes. Many other types of interfaces may be used, with many different ways to enter user preferences or likes.

Based upon the user preferences, the client 56 creates a filter 106 to accept the preferred Web content broadcast from the webcast center, while rejecting the non-preferred content. In the FIG. 4 implementation, the filter 106 is configured to receive announcements from the announcement listener 100 and based on the client preferences in the subscription database 102, decide whether the client should accept or reject the corresponding upcoming webcast group. The filter 106 might examine the group name, the URL range, and other information contained in the announcement to aid in the decision process. Depending on the decision, the filter 106 controls a receiver 108 to receive or ignore the associated content packages from the broadcast medium 54.

If the announcement is for a desired group, such as pages from the MSNBC site, the filter 106 invokes the receiver 108 and tells it which port to receive the incoming packages. The filter 106 also tells the receiver 108 what to name the file for storing the incoming packages based on the announcement. The receiver 108 interprets the protocol for delivering the packages and reconstructs the package file. The receiver stores the package file in a temporary package store 110 on the client's hard drive. When the package file is complete, the receiver 108 informs the filter 106 of whether the transfer is successful. If the transfer fails, the incomplete package file is deleted and the event is logged.

If the package file arrives intact, the filter 108 invokes an unpackager 112 to reconstruct the Web pages from the package file. The unpackager 112 may also be configured to determine whether the Web pages received from the broadcast medium 54 are more recent than the same Web pages that may already be stored at the client. In one possible situation, the user might have visited a Web site independently of the webcast transmission and downloaded pages from the Web site that are more recent than the version being broadcast by the webcast center. In this case, the client does not overwrite the more recent version, but instead disregards the Web content unpackaged by the unpackager 112. Assuming the pages received from the webcast center are more recent, the unpackager 112 stores the Web pages in a browser cache or file system 114. A browser (not shown) can then access the pages and render them on the client. An example of a suitable browser is the Internet Explorer browser sold by Microsoft Corporation.

An annotator 116 may be invoked to annotate the hyperlinks contained within the Web pages. The annotator 116 differentiates among links that have been actuated, links that go to content stored locally in the file system or cache 114, and links that go to content stored remotely from the client.

The annotation may be to use different colors to set apart the three sets of links, or to use different font or format styles. Annotated links make it more convenient for the user to quickly discern whether the content is available locally, and hence ready for immediate access, or whether he/she must access the content over the Internet, which may involve some delay.

The announcement listener 100, subscription UI 104, filter 106, unpackager 112, and annotator 116 are preferably implemented in software that executes on the client computer, set-top box, or television. These programs are stored in memory, such as disk memory or ROM (Read Only Memory), and execute on a processor. As one possible example, the client is a personal computer that runs a graphical windows-based operating system such as Windows® 95 from Microsoft Corporation. As another example, the client is a Web-enabled television that runs an operating system that is a derivative of the Windows®-brand operating systems.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A system for delivering Web content over a broadcast medium, comprising:

a webcast center to actively gather Web content from sites on the Internet by visiting the sites and fetching content from the sites, the webcast center storing the gathered Web content, the webcast center having a broadcast transmitter to transmit the gathered Web content over the broadcast medium; and multiple clients equipped with filters to receive a portion of the gathered Web content from one or more selected sites; and wherein the Web content comprises Web pages, and a packager is configured to organize the pages in alphabetical order according to their URLs (Universal Resource Locator) and to form package files that contain pages from same sites.

2. A system as recited in claim 1, wherein the webcast center is configured to continuously gather the Web content.

3. A system is recited in claim 1, wherein the webcast center actively gathers the Web content by retrieving a Web page at a root URL (Universal Resource Locator) and any additional Web pages within a Predetermined depth below the root URL.

4. A system as recited in claim 1, wherein the webcast center gathers Web pages and any in-line image files referenced by the Web pages.

5. A system as recited in claim 1, wherein the packager packages the Web content in the content cache into broadcast package files, and wherein the webcast center further comprises:

a content cache to store the Web content gathered from the sites; and a package store to store the broadcast package files prior to broadcast transmission.

6. A system has recited in claim 1, wherein the webcast center has a scheduler to schedule the sites and times to actively gather the Web content from the Internet.

7. A system as recited in claim 1, wherein each client has a subscription database to store a user's Web content preferences, the subscription database being utilized by the client's filter to selectively receive the preferred Web content.

8. A system as recited in claim 1, further comprising a content server configured to receive the broadcast Web content and to serve the Web content to one or more of the clients.

9. A system for delivering Web content over a broadcast medium, comprising:

a webcast center to actively gather Web content from sites on the Internet by visiting the sites and fetching content from the sites, the webcast center storing the gathered Web content, the webcast center having a broadcast transmitter to transmit the gathered Web content over the broadcast medium;

multiple clients equipped with filters to receive a portion of the gathered Web content from one or more selected sites; and wherein:

the broadcast transmitter at the webcast center transmits the Web content in individual packages; and each client has an unpackager to reconstruct the Web content from the packages, the unpackager being configured to determine whether the Web content received from the webcast center is more recent than any Web content from an identical site that may already be stored on the client.

10. A system for delivering Web content over a broadcast medium, comprising:

a webcast center to actively gather Web content from sites on the Internet by visiting the sites and fetching content from the sites, the webcast center storing the gathered Web content, the webcast center having a broadcast transmitter to transmit the gathered Web content over the broadcast medium;

multiple clients equipped with filters to receive a portion of the gathered Web content from one or more selected sites; and wherein each client has an annotator configured to annotate hyperlinks within the Web content to differentiate among first hyperlinks that access content not stored locally at the client and second hyperlinks that access content stored locally at the client.

11. A webcast center comprising:

a gatherer to actively gather Web content from sites on the Internet by visiting the sites and fetching content from the sites;

a content cache to store the Web content actively gathered from the sites by the gatherer;

a packager to package the Web content stored in the content cache into broadcast package files;

a package store to store the broadcast package files prior to broadcast transmission;

a broadcast transmitter to segment the package files from the package store into individual packages and transmit the packages over a broadcast medium; and wherein:

the gatherer retrieves the Web content from the sites and stores the Web content in the content cache at a first data rate; and the broadcast transmitter transmits the packages from the package store at a second data rate different from the first data rate.

12. A webcast center as recited in claim 11, wherein the broadcast transmitter continuously transmits the package files in the package store multiple times before the packager updates the package files in the package store.

13. For use in a system for delivering Web content in individual data packages over a broadcast medium to multiple clients, a package handling unit at each of the clients comprising:
   a receiver to reconstruct package files from the data packages;
   a package store to temporarily hold the package files containing the Web content; and
   an unpackager to reconstruct the Web content from the package files, the unpackager being configured to determine whether the Web content received in the package files from the broadcast medium is more recent than any duplicative Web content that may already be stored at the client as a result of the client retrieving the duplicative Web content from a same Web site from which the Web content in the package files came.

14. For use in a system for delivering Web content over a broadcast medium to multiple clients, an annotator program executing on each of the clients to annotate hyperlinks within the Web content to differentiate among first hyperlinks that access content not stored locally at the client and second hyperlinks that access content stored locally at the client.

15. An annotator program as recited in claim 14, further configured to annotate the hyperlinks to differentiate among third hyperlinks that have been actuated at least one by a user at the client.

16. A system for delivering Web content over a broadcast medium, comprising:
   (A) a webcast center comprising:
      (1) a gatherer to actively gather Web content from sites on the Internet by visiting the sites to retrieve the Web content;
      (2) a scheduler to schedule for the gatherer the sites and times to actively gather the Web content;
      (3) a content cache to store the Web content gathered from the sites by the gatherer;
      (4) a packager to package the Web content stored in the content cache into broadcast package files;
      (5) a package store to store the broadcast package files; and
      (6) a broadcast transmitter to segment the package files from the package store into individual packages and transmit the packages over a broadcast medium;
   (B) a client comprising:
      (1) a receiver to receive the broadcast packages;
      (2) a subscription database to store a directory of the Web content gathered by the webcast center;
      (3) a subscriber user interface executing at the client to enable a user to select preferred Web content from the directory of the subscription database;
      (4) a filter to direct the receiver to accept the packages carrying the preferred Web content selected by the user, while rejecting other packages carrying non-preferred Web content, and to reconstruct the package files from the accepted packages;
      (5) a client-side package store to temporarily hold the package files received by the receiver; and
      (6) an unpackager to determine whether the Web content in the package files received from the broadcast medium is more recent than any other version of the Web content that may already be stored at the client.

17. A system as recited in claim 16, wherein the gatherer is configurable, for each of the sites, to gather a home Web page at a root URL (Universal Resource Locator) and any additional Web pages within a predefined depth below the root URL.

18. A system as recited in claim 16, wherein the gatherer is configured to retrieve Web pages and any in-line image files referenced by the home Web pages.

19. A system as recited in claim 16, wherein:
   the gatherer retrieves the Web content from the sites and stores the Web content in the content cache at a first data rate; and
   the broadcast transmitter transmits the packages from the package store at a second data rate different from the first data rate.

20. A system as recited in claim 16, wherein the broadcast transmitter continuously transmits the package files in the package store multiple times before the packager updates the package files in the package store.

21. A system as recited in claim 16, wherein the webcast center further comprises an announcement generator to send announcements informing the client of the Web content to be transmitted in future broadcast transmissions.

22. A system as recited in claim 16, wherein the client further comprises an annotator to annotate hyperlinks within the preferred Web content, the annotated hyperlinks differentiating between first hyperlinks that access content not stored locally at the client and second hyperlinks that access content stored locally at the client.

23. A method for delivering Web content to clients, comprising:
   actively gathering the Web content from sites on the Internet by visiting the site to retrieve the Web content;
   storing the Web content in a first cache;
   packaging the Web content from the first cache into package files;
   storing the package files in a second cache;
   broadcasting the package files from the second cache over the broadcast medium; and
   receiving the package files at a client;
   filtering the package files to retain files containing the Web content preferred by a user;
   reconstructing the preferred Web content from the retained package files; and
   annotating hyperlinks within the Web content to differentiate among first hyperlinks that access content not stored locally at the client and second hyperlinks that access content stored locally at the client.

24. A method as recited in claim 23, further comprising retrieving, at each of the sites, a Web page at a root URL (Universal Resource Locator) and any additional Web pages within a predetermined depth below the root URL.

25. A method as recited in claim 23, further comprising retrieving Web pages and any in-line image files referenced by the Web pages.

26. A method as recited in claim 23, further comprising scheduling the sites and times to gather the Web content from the Internet.

27. A method as recited in claim 23, further comprising gathering the Web content at a first data rate and broadcasting the package files at a second data rate that is different from the first data rate.

28. A method as recited in claim 23, further comprising examining the preferred Web content after reconstructing to determine whether the Web content is more recent than any other version of the Web content that may already be stored at the client.

29. In a system for delivering Web content over a broadcast medium from a webcast center to multiple clients, a computer-implemented method for cumulating Web content at the webcast center comprising instructions for:
  gathering the Web content from sites on the Internet by visiting the site to retrieve the Web content;
  storing the Web content in a first cache;
  packaging the Web content from the first cache into package files;
  storing the package files at a second cache;
  gathering the Web content from the sites; and
  storing the Web content in the content cache at a first data rate that is different from and independent of a second data rate at which the packages from the package store are transmitted over the broadcast medium.

30. A computer-implemented method as recited in claim 29, further comprising:
  segmenting the package files from the package store into individual packages; and
  transmitting the packages over a broadcast medium.

31. A computer-implemented method as recited in claim 29, further comprising transmitting the packages multiple times between updating the Web content in the package files.

32. In a system for delivering Web content over a broadcast medium from a webcast center to multiple clients, a computer-implemented method comprising annotating, at a client, hyperlinks within the Web content to differentiate among first hyperlinks that access content not stored locally at the client and second hyperlinks that access content stored locally at the client.

33. A method as recited in claim 32, further comprising annotating the hyperlinks to differentiate among third hyperlinks that have been actuated at least one by a user at the client.

34. A computer-readable medium having computer-readable instructions for performing the method recited in claim 32.

* * * * *

UNITED STATES PATENT AND TRADEMARK OFFICE
CERTIFICATE OF CORRECTION

PATENT NO.     : 6,442,598 B1
DATED          : August 27, 2002
INVENTOR(S)    : Wright et al.

It is certified that error appears in the above-identified patent and that said Letters Patent is hereby corrected as shown below:

Column 11,
Line 9, replace "fill" with -- full --.

Column 13,
Line 49, replace "Predetermined" with -- predetermined --.

Signed and Sealed this

Fourth Day of February, 2003

JAMES E. ROGAN
*Director of the United States Patent and Trademark Office*